US009438092B2

(12) United States Patent
Becker

(10) Patent No.: US 9,438,092 B2
(45) Date of Patent: Sep. 6, 2016

(54) ELECTRIC DISK ROTOR MOTOR AND ELECTRIC BICYCLE OR PEDELEC COMPRISING A DISK ROTOR MOTOR

(75) Inventor: Christian Becker, Mannheim (DE)

(73) Assignee: BINOVA GMBH, Glashütte Schlottwitz (DE)

( * ) Notice: Subject to any disclaimer, the term of this patent is extended or adjusted under 35 U.S.C. 154(b) by 395 days.

(21) Appl. No.: 13/883,421

(22) PCT Filed: Nov. 7, 2011

(86) PCT No.: PCT/EP2011/069560
§ 371 (c)(1),
(2), (4) Date: Jul. 8, 2013

(87) PCT Pub. No.: WO2012/062710
PCT Pub. Date: May 18, 2012

(65) Prior Publication Data
US 2013/0277131 A1    Oct. 24, 2013

(30) Foreign Application Priority Data
Nov. 10, 2010    (DE) .................. 10 2010 060 482

(51) Int. Cl.
*H02K 3/30*    (2006.01)
*H02K 16/02*    (2006.01)
(Continued)

(52) U.S. Cl.
CPC .............. *H02K 16/02* (2013.01); *B60L 11/007* (2013.01); *B60L 11/1805* (2013.01); *B60L 15/20* (2013.01);
(Continued)

(58) Field of Classification Search
CPC .......... H02K 3/30; H02K 3/21; H02K 21/24; H02K 1/148; H02K 16/02; B62M 6/55; Y02T 10/72; Y02T 10/7005; Y02T 10/7275; Y02T 10/641; Y02T 10/645

USPC ...... 310/43, 156.37, 216.06, 75 C, 112, 268; 180/206.4
IPC ............... H02K 3/30,16/02, 21/24; B62M 6/55
See application file for complete search history.

(56) References Cited

U.S. PATENT DOCUMENTS 3,002,399 A    10/1961    Ruess
4,761,590 A    8/1988    Kaszman
(Continued)

FOREIGN PATENT DOCUMENTS

CN    2905648 Y    5/2007
DE    31 42 913 A1    5/1983
(Continued)

OTHER PUBLICATIONS

Merriam-Webster.com, Defintion of the term "distance."*
(Continued)

*Primary Examiner* — John K Kim
(74) *Attorney, Agent, or Firm* — Keller Jolley Preece

(57) ABSTRACT

An electric disk-armature motor includes at least one stator in the form of a disk, at least one rotor in the form of an armature disk which is mounted rotatably about an axis of rotation with respect to the stator and/or a motor housing. The rotor and the stator are oriented parallel to one another and are spaced apart from one another by a gap. An end side of the rotor, which end side faces the stator, has a multiplicity of permanent magnets polarized in the axial direction, which are arranged in the form of a ring around the axis of rotation. A north pole and a south pole faces the stator alternately in the tangential direction, and wherein the stator has a multiplicity of coil elements. An electric bicycle or pedelec comprises such a disk-armature motor.

9 Claims, 6 Drawing Sheets

(51) Int. Cl.
  *H02K 21/24* (2006.01)
  *B62M 6/55* (2010.01)
  *H02K 1/14* (2006.01)
  *B60L 11/00* (2006.01)
  *B60L 11/18* (2006.01)
  *B60L 15/20* (2006.01)

(52) U.S. Cl.
  CPC ............... *B62M 6/55* (2013.01); *H02K 1/148* (2013.01); *H02K 3/30* (2013.01); *H02K 21/24* (2013.01); *B60L 2200/12* (2013.01); *B60L 2240/423* (2013.01); *Y02T 10/641* (2013.01); *Y02T 10/645* (2013.01); *Y02T 10/7005* (2013.01); *Y02T 10/72* (2013.01); *Y02T 10/7275* (2013.01)

(56) References Cited

U.S. PATENT DOCUMENTS

| | | | |
|---|---|---|---|
| 5,216,339 A | 6/1993 | Skybyk | |
| 5,801,473 A * | 9/1998 | Helwig | 310/216.061 |
| 6,891,306 B1 * | 5/2005 | Soghomonian | H02K 1/182 310/156.38 |
| 7,554,241 B2 * | 6/2009 | Rao | H02K 1/12 310/203 |
| 7,755,244 B2 * | 7/2010 | Ley | H02K 1/148 310/201 |
| 7,786,646 B2 * | 8/2010 | Lu | H02K 1/14 310/156.32 |
| 8,042,257 B2 * | 10/2011 | Kojima | H02K 15/022 29/598 |
| 8,791,616 B2 * | 7/2014 | Canini | H02K 1/14 310/156.32 |
| 2002/0175582 A1 | 11/2002 | Lopatinsky et al. | |
| 2006/0043821 A1 * | 3/2006 | Kojima et al. | 310/268 |
| 2006/0090943 A1 | 5/2006 | Perng | |
| 2006/0131986 A1 * | 6/2006 | Hsu et al. | 310/268 |
| 2006/0284507 A1 | 12/2006 | Murakami | |
| 2007/0228860 A1 * | 10/2007 | Rao | H02K 1/12 310/156.37 |
| 2010/0051373 A1 * | 3/2010 | Lee | B62M 6/55 180/206.4 |

FOREIGN PATENT DOCUMENTS

| | | |
|---|---|---|
| DE | 3142913 A1 | 5/1983 |
| DE | 195 22 419 A1 | 1/1997 |
| DE | 100 28 936 A1 | 12/2001 |
| DE | 10 2009 032 389 A1 | 1/2010 |
| EP | 0 683 093 A1 | 4/1995 |
| EP | 1 542 343 A1 | 6/2005 |
| EP | 1 746 705 A2 | 1/2007 |
| GB | 2 312 403 A | 10/1997 |
| GB | 2 360 140 A | 9/2001 |
| WO | 2004/017497 A1 | 2/2004 |
| WO | 2004017497 A1 | 2/2004 |
| WO | 2004/073143 A1 | 8/2004 |
| WO | 2008/092630 A2 | 8/2008 |
| WO | 2009/010943 A2 | 1/2009 |
| WO | 2010/070405 A2 | 6/2010 |

OTHER PUBLICATIONS

Schiemann, Max: Bau and Betrieb elektrischer Bahnen. Leipzig: Verlag von Oskar Leiner, Sep. 1898. S. 1.—ISBN—(2 pgs.).

* cited by examiner

ELECTRIC DISK ROTOR MOTOR AND ELECTRIC BICYCLE OR PEDELEC COMPRISING A DISK ROTOR MOTOR

CROSS-REFERENCE TO RELATED APPLICATIONS

This application is a national phase entry under 35 U.S.C. §371 of International Application No. PCT/EP2011/069560 filed Nov. 7, 2011, which claims the benefit of German Application No. 10 2010 060 482.8, filed Nov. 10, 2010. The entire contents of each of the foregoing patent applications are hereby incorporated by reference.

BACKGROUND OF THE INVENTION

1. Field of the Invention

The invention relates to an electric disk-armature motor in accordance with the preamble of claim 1 and an electric bicycle or pedelec comprising a disk-armature motor in accordance with the invention.

2. Background and Relevant Art

In a disk-armature motor, the rotor and the stator have a disk shape. A disk is thin in comparison to its planar extent. The rotor and stator disks of the disk-armature motor are arranged parallel to one another and perpendicular to the axis of rotation of the motor along this axis of rotation. This means that disk-armature motors have a design which markedly differs from the design of other electric motors. Their diameter perpendicular to the axis of rotation is greater than their axial length, generally a multiple greater.

The disk-armature motors on which the invention is based comprise at least one stator in the form of a disk and at least one rotor in the form of an armature disk which is mounted rotatably about an axis of rotation with respect to the stator and/or a motor housing. The rotor (rotor disk) and the stator (stator disk) are oriented parallel to one another and are spaced apart from one another by a gap. An end side of the rotor, which end side faces the stator (the stator disk), has a multiplicity of permanent magnets polarized in the axial direction, which permanent magnets are arranged in the form of a ring around the axis of rotation, wherein a north pole and a south pole faces the stator alternately in the tangential direction. The stator has a multiplicity of coil elements, which are arranged in the form of a ring around the axis of rotation of the rotor.

In known designs, the coil axes of the coil elements are aligned axially in relation to the axis of rotation of the rotor. The coil element is therefore polarized in the axial direction as are the permanent magnets of the rotor, wherein the specific polarization is dependent on the direction of the current flow through the coil wires. Correspondingly, the poles of the coil elements interact with the permanent magnets of the rotor.

One disadvantage with this is that each coil element only ever interacts with a rotor via a pole and therefore a pole face. The coil elements are generally flat coils with a comparatively large cross section, with the result that, correspondingly, the poles also form comparatively large pole faces. This means that disk-armature motors require a comparatively large cross section in order to be able to provide a desired torque.

BRIEF SUMMARY OF THE INVENTION

The invention is based on the object of specifying an improved disk-armature motor. In particular, a disk-armature motor with a higher pole density than for previously known disk-armature motors and therefore a higher possible torque given the same diameter is specified. Preferably, the disk-armature motor will be able to provide a desired torque with markedly more compact dimensions than in the prior art. In addition, an improved electric bicycle or pedelec with such a disk-armature motor is specified.

This object is achieved in respect of the disk-armature motor by the features of claim 1 and in respect of the electric bicycle or pedelec by the features of claim 8. Advantageous configurations and developments are specified in the dependent claims.

The disk-armature motor according to the invention is characterized in that the at least one stator is arranged between two rotors, which are mounted rotatably about a common axis of rotation. Thus, the disk-armature motor has at least two of the above-described rotors and therefore two rotor disks, which are arranged on both sides of the stator disk.

Furthermore, the disk-armature motor according to the invention is characterized in that the coil elements are arranged in such a way that their respective coil axis is aligned tangentially about the common axis of rotation of the rotors. Preferably, the two rotors interact with one another and jointly provide the output torque of the motor at its output shaft.

Furthermore, the invention envisages that the coil elements each have a coil former with a coil core around which a coil wire is wound, wherein the coil core has, at its opposite ends along the coil axis, two mutually opposite pole bodies, which extend in the axial and/or radial direction in relation to the axis of rotation of the rotor on both sides beyond the coil core. Therefore, the coil wire is fixed by the pole bodies on the coil core; it cannot slide from the coil core as a result of the protruding pole bodies. The coil former therefore has substantially the form of an H in cross section. The coil element has a concentrated coil winding. The coil element is made into a compact structural unit by the coil former, which enables simple production of the stator. The mutually opposite pole bodies of a coil element always have opposite polarizations since they are associated with the opposite coil ends.

Finally, the disk-armature motor according to the invention is also characterized in that both pole bodies of each coil element each form pole faces, which, on both mutually opposite end sides of the stator which face the rotors, are at least sectionally opposite the permanent magnets of the respective rotor. Thus, each pole body extends axially through the stator; it forms a pole face with identical polarization on both stator sides. Each pole of the coil element is thus used twice, namely for interacting with each of the two rotors adjoining the stator.

In this case, a coil element is understood to mean a magnetically isolated individual element with an independent coil, for example a wire winding, i.e. the coil of a coil element can be actuated electrically individually for producing an individual magnetic field of the coil element. In particular, individual actuation of the coil element independently of adjacent coil elements is possible. In addition, the coil formers of adjacent coil elements are expediently components which are spaced apart from one another, in particular components which are separated from one another by a polymer layer and/or are cast into a polymer compound.

The advantages of the invention consist in particular in that, in the disk-armature motor according to the invention, the number of poles which interact with a rotor and the permanent magnet thereof is doubled in comparison with a disk-armature motor of the known type with an axial coil axis. Owing to the tangential alignment of the coil axis, the magnetic lines of force likewise run tangentially within the coil. On emerging from the coil at both ends, lines of force also run to the sides and therefore also towards the rotors associated with the stator. Therefore, both the north pole and the south pole of each coil and therefore each coil element form a pole which interacts with the permanent magnets on the associated rotors. Each coil element therefore forms in each case both a north pole and a south pole in the direction towards both adjacent rotors. In the case of the axial alignment of the coil axis, however, only the north pole or the south pole of a coil element interacts with the permanent magnets on an associated rotor.

It is also advantageous that, in accordance with the invention, it is that coil side of the coil elements which is parallel to the coil axis and not the coil ends along the coil axis which faces the rotor(s). These coil sides have smaller dimensions that the coil ends of known disk-armature motors.

The stator of the disk-armature motor according to the invention has a "pole number to coil" ratio of 2 to 1 per adjacent rotor; two poles are active per coil and therefore per coil element for each adjacent rotor.

Both the doubling of the active pole number in comparison with disk-armature motors with axially aligned coil elements and the advantages in terms of area of the coil alignment enable a much greater pole density in the disk-armature motors according to the invention in comparison with known disk-armature motors. This in turn results in a much greater torque which can be provided by a disk-armature motor according to the invention in comparison with a known disk-armature motor with comparable external dimensions.

The two pole faces of each pole body which are provided in the solution according to the invention are formed opposite one another on the end sides of the stator. Each pole face pair necessarily has a uniform magnetic polarization, i.e. both pole faces of a pole body form either a north pole or a south pole. Correspondingly, the permanent magnets on both rotors which are in each case opposite these pole faces also have the same magnetic polarization, i.e. the axially mutually facing permanent magnet poles of the two rotors enclosing the stator have the same magnetic polarization: they are either two south poles or two north poles. In other words: the two rotors are oriented with respect to one another in such a way that a permanent magnet pole of one rotor which faces the other rotor is turned towards a permanent magnet pole of the other rotor which has the same magnetic polarization, i.e. a north pole of one rotor faces a north pole of the other rotor and a south pole of one rotor faces a south pole of the other rotor. This means that two permanent magnet poles of the two rotors with the same polarization interact with the associated coil element via the two pole faces of a pole body, with this being both on the north pole side and on the south pole side of the coil element, in each case with opposite magnetic polarizations. This results in doubling of the magnetic flux in the coil core in comparison with stator/rotor arrangements with an axial alignment of the coil axes.

Preferably, the disk-armature motor according to the invention is a DC motor and/or a brushless disk-armature motor.

Preferably, the pole bodies extend on both sides of the stator disk as far as the surface of the stator and form pole faces there, which lie in the stator surface. These pole faces are opposite those poles of the permanent magnets which are arranged on the surface of the rotors and are preferably likewise flat there and interact with said poles.

One variant embodiment of the invention envisages that the pole faces are formed on a widened portion of the pole body, which widened portion is tangential in relation to the axis of rotation of the rotor, in particular on a widened portion in the direction of the respective other pole body of the same coil element. Therefore, the area of the stator which interacts magnetically with the permanent magnets on the rotor(s) is increased. Surface regions of the stator which cover the coil wire and the coil core are thus also available as pole faces. As a result of this too, the performance of the disk-armature motor is improved or more compact dimensions of the motor given the same power are possible.

A development of the invention envisages that the pole bodies are aligned radially in relation to the axis of rotation of the rotor, with the result that the distance between the two pole bodies of a coil element and/or the tangential extent of the coil element increase(s) as the radial distance from the axis of rotation of the rotor increases. As a result, a uniform interaction of the pole faces with the permanent magnets on the rotor(s) is ensured, which is important in particular in the case of a large radial extent of the pole faces. When considered differently, this formation of the pole bodies enables the provision of pole faces with a comparatively large radial extent, which results in an increase in the power of the disk-armature motor still with compact dimensions given a corresponding formation of the permanent magnets on the rotors.

A development in which the coil core is a flat body, whose radial and/or tangential extent in relation to the axis of rotation of the rotor exceeds its axial extent by a multiple also contributes to a high power given compact dimensions. This enables axially compact stators and therefore correspondingly compact disk-armature motors. At the same time, in particular a comparatively large radial extent of the coil core and therefore of the coil element results in a correspondingly large radial extent of the pole body and therefore of the pole faces, which likewise provides the possibility of powerful compact motors.

Preferably, the coil former consists partially or entirely of a magnetic material. As a result, the magnetic field strengths are formed with the desired intensity, and the magnetic field of the coil is directed in the desired directions. Metal is of course taken into consideration for this, but also a magnetic polymer (a magnetically conductive polymer, i.e. a polymer enriched with magnetically conductive metal particles) is possible. When using the magnetic polymer, the coil element and therefore the stator can be produced particularly inexpensively, for example by means of injection molding.

It has proven expedient to manufacture the rotors and/or the stator in an injection molding method with inserts since this type of production is particularly inexpensive.

The electric bicycle or pedelec according to the invention has a disk-armature motor according to the invention corresponding to the above statements. Here, the advantages consist in particular in the compact dimensions of the motor whilst retaining a high power, as a result of which the accommodation of the motor is facilitated and in particular also visually appealing solutions without any voluminous addons or frame enlargements are possible.

Furthermore, it is envisaged that this disk-armature motor is arranged between a bottom bracket and a chainring on the pedal spindle of the electric bicycle or pedelec, wherein the rotors are connected to the pedal spindle in such a way that the rotors can transmit a torque to the pedal spindle, in particular via a direct fixed connection or toothed connection, without a transmission thread.

This arrangement of the disk-armature motor has the advantage that the motor is not visible or is at least barely visible behind the chainring. The actual bicycle frame can be formed, at least in terms of the electric drive, without any substantial changes to its visual appearance. In particular, the region of the bottom bracket does not need to be enlarged markedly owing to the arrangement of the motor there, as in known electric bicycles. The bicycle therefore retains the visual appearance of a conventional bicycle without an electric drive. The direct torque transmission without a transmission thread is also advantageous. This also reduces the amount of space required.

BRIEF DESCRIPTION OF THE DRAWINGS

The invention will be explained in more detail below also in respect of further features and advantages with reference to the description of exemplary embodiments and with reference to the attached, schematic drawings, in which.

Mutually corresponding parts and components are denoted by the same reference symbols in the figures.

DETAILED DESCRIPTION

Figure 1:
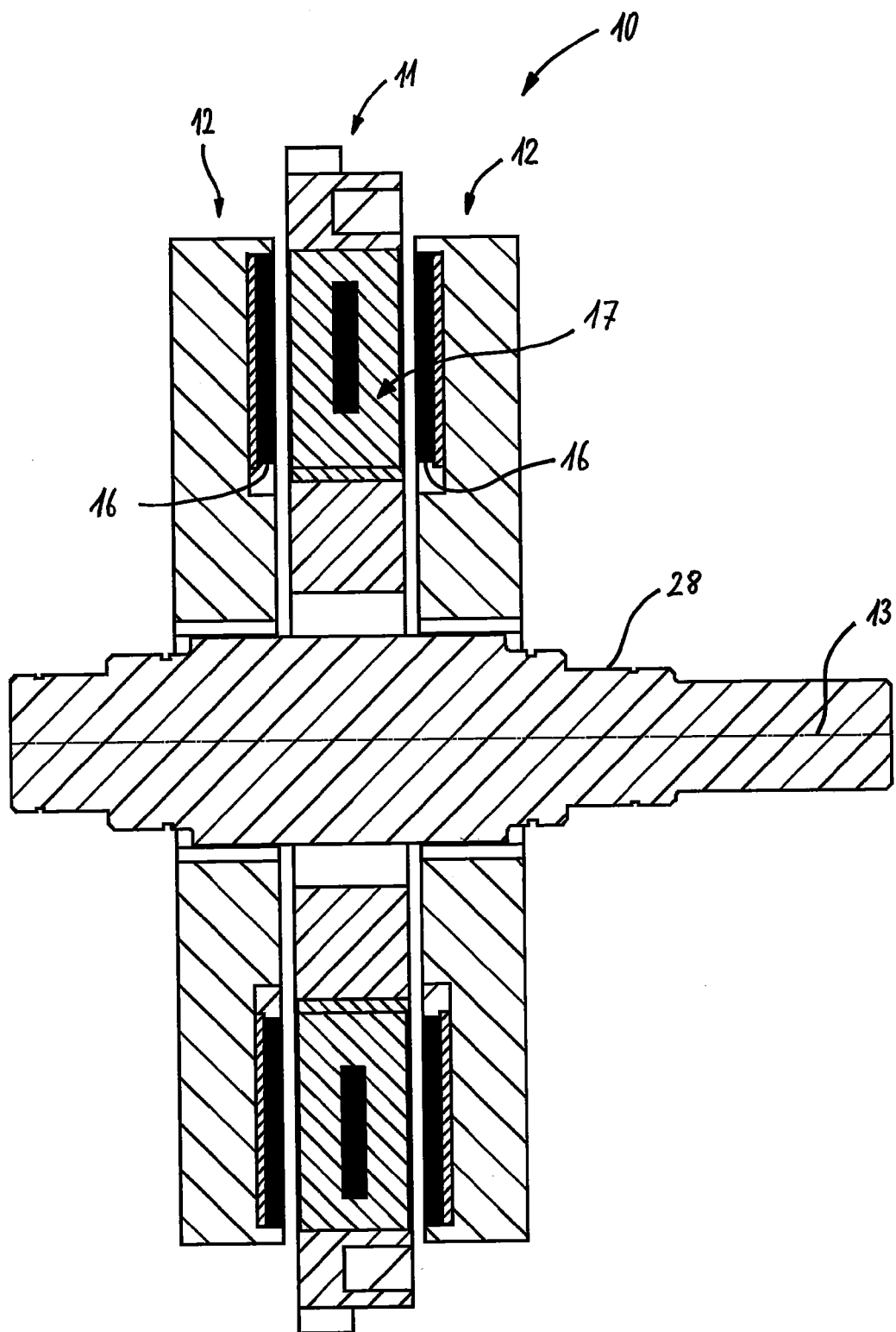
FIG. 1 shows a lateral cross section along the axis of rotation of an exemplary embodiment of a disk-armature motor in accordance with the invention.

The disk-armature motor 10 illustrated in FIG. 1 to FIG. 5 has a stator 11, which is arranged between two rotors 12. The stator 11 is in the form of a stator disk 11. The rotors 12 are in the form of rotor disks 12, wherein the rotor disks 12 are armature disks which are mounted rotatably about an axis of rotation 13 with respect to the stator 11 and possibly also a motor housing (not illustrated).

FIG. 1 shows that the rotor disk 12 and the stator disk 11 are aligned perpendicular to the axis of rotation 13 and are oriented parallel to one another. They are arranged along the axis of rotation 13. The stator disk 11 is spaced apart from the two rotor disks 12 by a gap 14.

The two rotors 12 are connected in rotationally fixed fashion to a drive spindle 28, for example a pedal spindle 28, via teeth at an inner cutout 30 (see FIG. 3), i.e. they can transmit a torque to the drive spindle 28. Both rotors 12 transmit their torque to a common drive spindle 28. Both rotors 12 rotate together with the drive spindle 28, which likewise rotates about the common axis of rotation 13.

The stator disk 11 likewise has an inner cutout 31, which does not have any teeth and has a slightly larger diameter than the inner cutout 30 of the rotor disk 12. Thus, the stator disk 11 engages around the drive spindle 28 which passes through its inner cutout 31 without being operatively connected thereto, i.e. the drive spindle 28 is rotatable with respect to the stator disk 11. Any other desired arrangements which enable the drive spindle 28 to rotate with respect to the stator disk 11 can also be provided, for example ball bearings.

An end side 15 of the two rotors 12 which faces the stator disk 11 has a multiplicity of permanent magnets 16 polarized in the axial direction. Said permanent magnets are arranged in the form of a ring around the axis of rotation 13 (see FIG. 3), wherein a north pole and a south pole faces the stator 11 alternately in the tangential direction.

Figure 2:
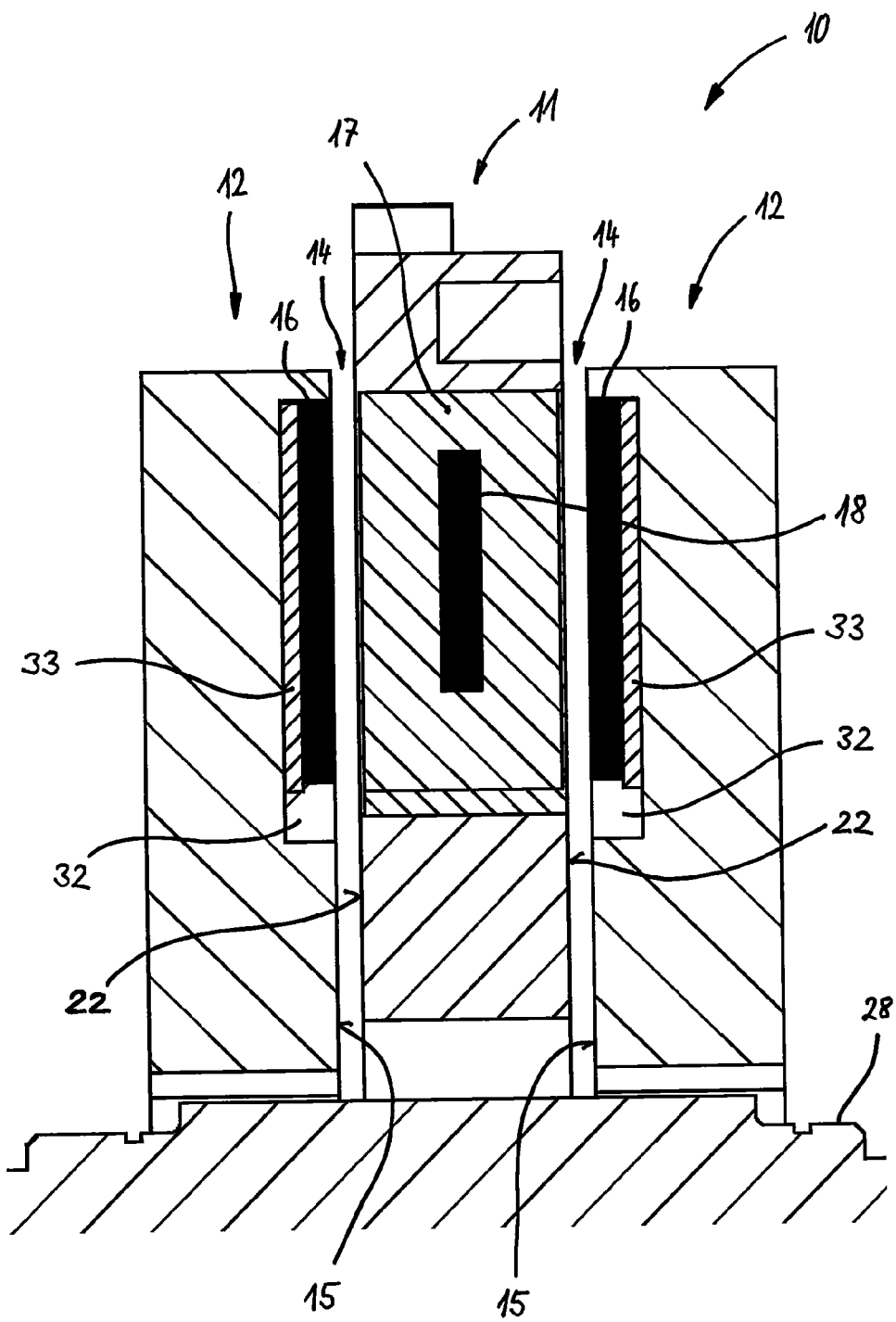
FIG. 2 shows an enlarged illustration of the upper half in FIG. 1.
Figure 3:
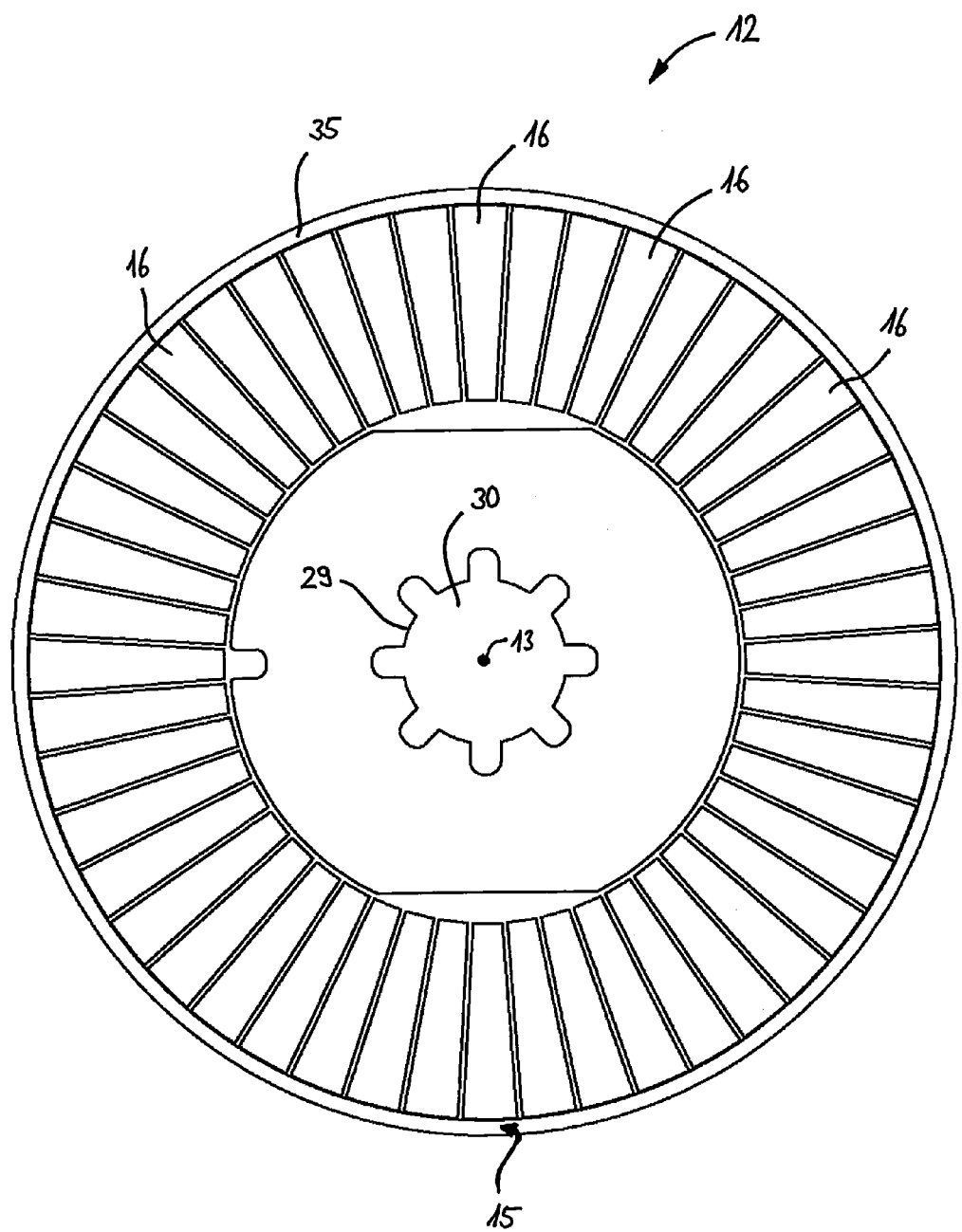
FIG. 3 shows one of the rotors of the disk-armature motor shown in FIG. 1 in a plan view of the end side facing the stator.

FIG. 2 shows that the permanent magnets 16 are inserted into a cutout 32 in a basic body 35 of the rotor disk 12, with the result that that face of the permanent magnets 16 which faces the stator 11 forms a planar end side 15 with the rest of the rotor disk 12. On the rear side of the permanent magnets 16 which faces away from the stator 11, a magnetic return path lamination 33 is arranged in the cutout 32, which magnetic return path lamination extends in a form of a ring peripherally around the axis of rotation 13 and continuously over the rear side of all permanent magnets 16. The basic body 35 of the rotor disk 12 into which the permanent magnets 16 and possibly the magnetic return path laminations 33 are inserted can be a polymeric body.

Figure 5:
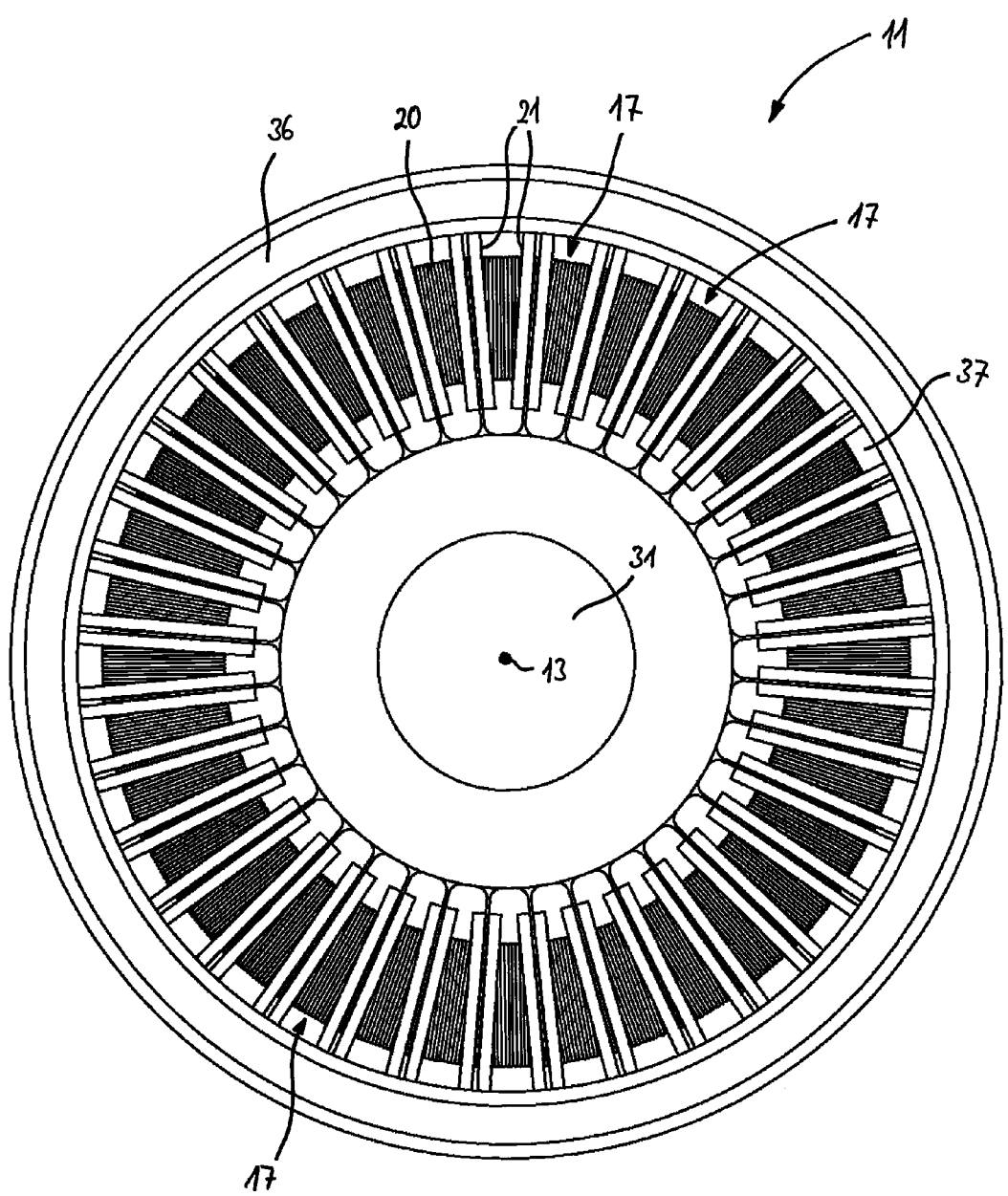
FIG. 5 shows a plan view of the stator of the disk-armature motor shown in FIG. 1.

The stator 11 has a large number of coil elements 17, which are arranged spaced apart from one another in the form of a ring around the axis of rotation 13 of the rotor 12 (see FIG. 5). The coil elements 17 are arranged in such a way that their respective coil axis, i.e. the center line through the coil winding, is aligned tangentially about the axis of rotation 13 of the rotor 12. All of the coil axes of the coil elements 17 arranged in the form of a ring are therefore tangents to a circle about the axis of rotation 13 of the rotor 12. The coil elements 17 are arranged in a basic body 36 of the stator disk 11, which can be a polymeric body, for example. The windings consisting of coil wire 20 of the coil elements 17 are sealed by being potted with polymer 37, with the result that the winding is embedded in the interior of the stator disk. The distance between the coil elements 17 can also be embedded in this polymer potting 37.

Figure 4:
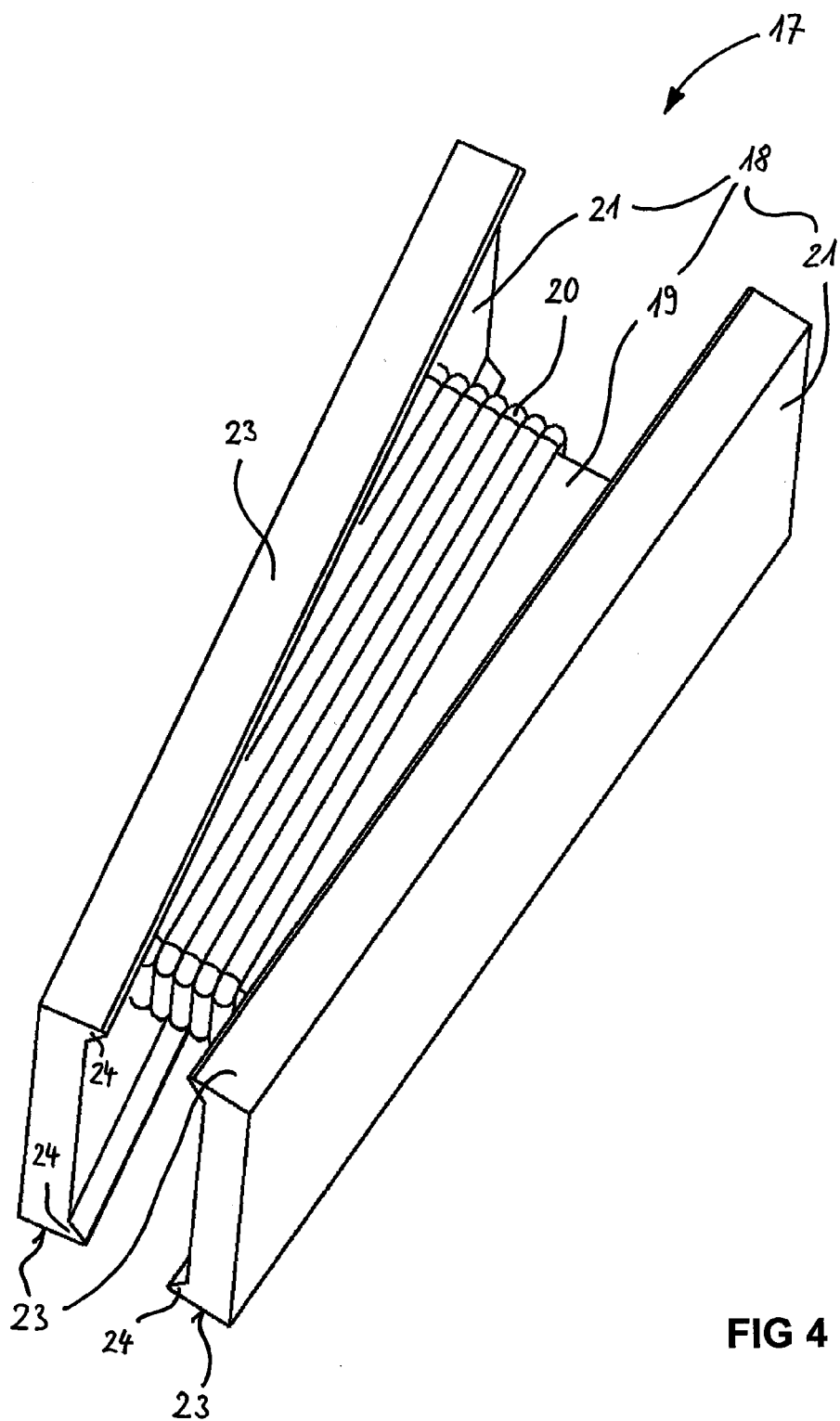
FIG. 4 shows a three-dimensional illustration of one of the coil elements of the stator of the disk-armature motor shown in FIG. 1.

An individual coil element 17 is shown in FIG. 4. It has a coil former 18. This coil former comprises a coil core 19 around which a coil wire 20 is wound. The coil core 19 is a flat body, whose radial and tangential extent in relation to the axis of rotation 13 of the rotor 12 (not illustrated in FIG. 4; the alignment of the coil elements is shown in FIG. 5) exceeds its axial extent by a multiple. In other words: the coil core 19 is a flat strip of material. It is arranged in the axial center of the stator disk 11 and is aligned parallel thereto.

FIG. 4 furthermore shows that the coil core 19 has two mutually opposite pole bodies 21 at its opposite ends along the coil axis, which runs through the coil core 19, to be precise in the center of the winding from the coil wire 20. The pole bodies 21 extend in the axial and radial directions in relation to the axis of rotation 13 of the rotor 12 (not illustrated in FIG. 4; the alignment of the coil elements is shown in FIG. 5) beyond the coil core 19 on both sides. In other words: both pole bodies 21 of a coil element 17 protrude on all sides beyond the coil core in a plane perpendicular to the coil axis. The coil wire 20 therefore cannot slide from the coil core 19.

It is furthermore shown in FIG. 4 and FIG. 5 that both pole bodies 21 of the coil elements 17 each form pole faces 23, which are opposite the permanent magnets 16 of the respective rotor 12 on both end sides 22 of the stator 11 which are opposite one another and face the rotors 12. The pole faces 23 form, with the rest of the stator disk 11, a planar end side 22. The pole bodies 21 extend in the axial direction in relation to the axis of rotation 13 of the rotor 12 between the mutually opposite pole faces 23, through the entire stator disk 11.

As can further be seen from FIG. 4, the pole faces 23 are formed on a widened portion 24 of the pole body 21, which widened portion is tangential in relation to the axis of rotation 13 of the rotor 12. This widened portion 24 is formed in the direction of the respective other pole body 21 of the same coil element 17, i.e. the widened portion 24 extends at least over part of the winding comprising the coil wire 20.

FIG. 5 shows that the pole bodies 21 are aligned radially in relation to the axis of rotation 13 of the rotor 12, with the result that the distance between the two pole bodies 21 of the coil element 17 and therefore also the tangential extent of the coil element 17 increase as the radial distance from the axis of rotation 13 of the rotor 12 increases. This can also clearly be seen from FIG. 4.

The individual coil elements 17 of the stator 11 are electrically actuated in such a way that the magnetic fields produced interact with the permanent magnets 16 on the rotors 12 via the pole faces 23 of the pole bodies 21 to the extent that the rotors 12 are actuated so as to rotate with respect to the stator 11.

The coil former 18 can consist completely or else only partially of magnetic polymer or magnetic metal.

The production of the rotors 12 and stators 11 can be performed in such a way that said rotors and stators are manufactured in an injection molding process with inserts, i.e. the coil elements 17 or the permanent magnets 16 and possibly in each case further parts, for example the magnetic return path lamination 33, are positioned in the respective mold cavity of an injection molding machine. Then, polymer is injected. After curing, the respective parts are embedded in the stator disk 11 or the rotor disks 12 in the desired position.

Figure 6:
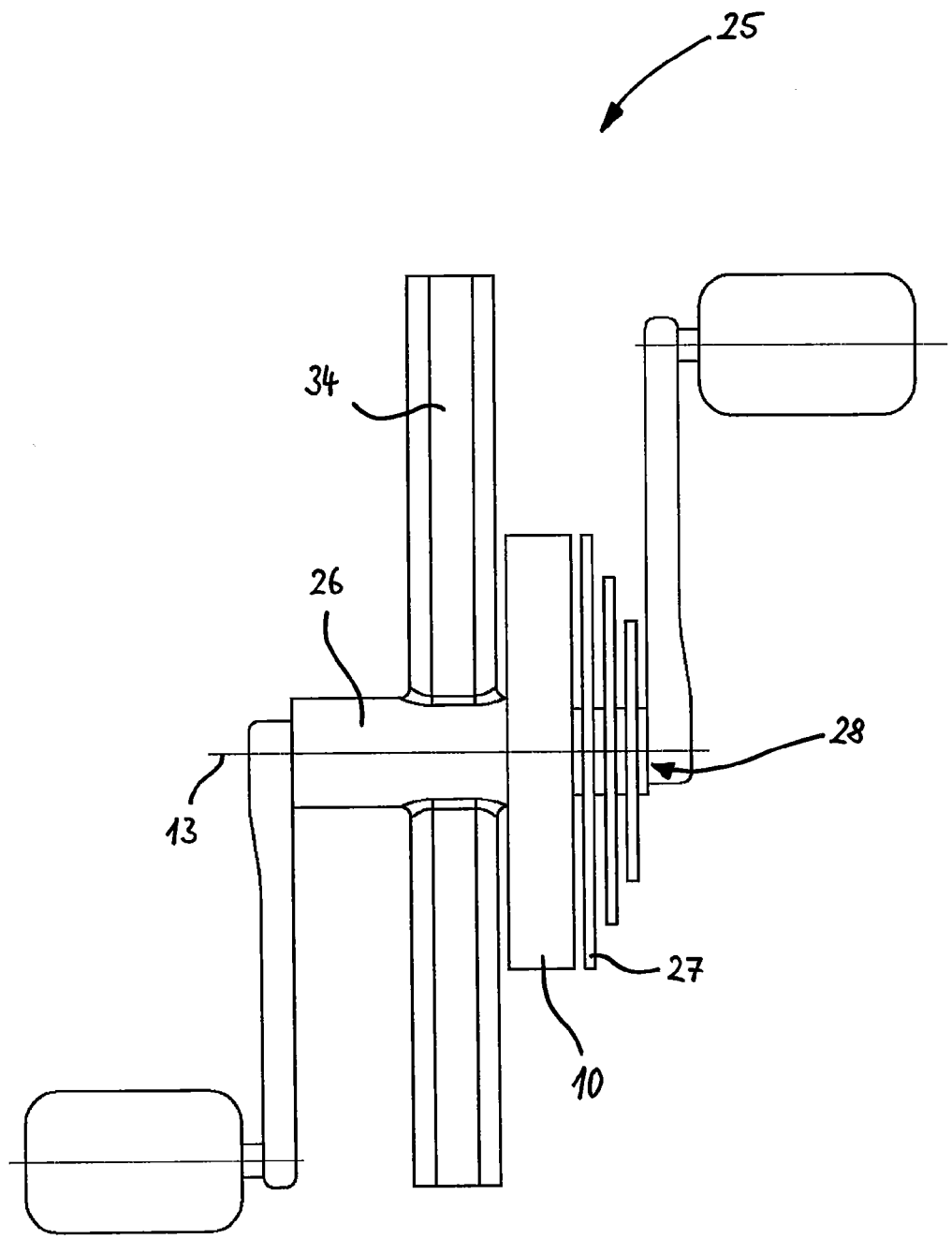
FIG. 6 shows a schematic illustration, by way of example, of the drive region of an electric bicycle or pedelec according to the invention with a disk-armature motor according to the invention.

FIG. 6 shows a schematic illustration, by way of example, of the drive region of an electric bicycle 25 or pedelec 25. The drive has a disk-armature motor 10 according to the invention. This disk-armature motor is arranged between a bottom bracket 26 and a chainring 27 on the pedal spindle 28 of the electric bicycle 25 or pedelec 25. A frame 34 of the electric bicycle 25 or pedelec 25 adjoins the bottom bracket 26, or the bottom bracket housing is part of the frame 34. The exemplary embodiment illustrated has two further chainrings in addition to the chainring 27 already mentioned.

It can clearly be seen that the radial dimensions of the disk-armature motor 10 correspond to those of the chainring 27 and that the axial diameter of the disk-armature motor 10 approximately corresponds to the axial extent of the chainring unit with the three chainrings. Therefore, the disk-armature motor 10 can barely be seen by an observer of the electric bicycle 25 or pedelec 25, and the disk-armature motor 10 does not result in a bicycle which is unattractive and has clunky operation.

FIG. 6 does not show that the rotor(s) 12 of the disk-armature motor 10 is/are connected to the pedal spindle 28 in such a way that the rotor(s) 12 can transmit a torque to the pedal spindle 28, in particular via a direct fixed connection or toothed connection, without a transmission thread. The disk-armature motor 10 can be the disk-armature motor 10 illustrated without a housing in FIGS. 1 to 5.

LIST OF REFERENCE SYMBOLS

10 Disk-armature motor
11 Stator, stator disk
12 Rotor, rotor disk
13 Axis of rotation
14 Gap
15 Inside of rotor
16 Permanent magnet
17 Coil element
18 Coil former
19 Coil core
20 Coil wire
21 Pole body
22 End side of stator
23 Pole faces
24 Widened portion
25 Electric bicycle, pedelec
26 Bottom bracket
27 Chainring
28 Drive spindle, pedal spindle
29 Teeth
30 Inner cutout of rotor disk 12
31 Inner cutout of stator disk 11
32 Cutout of rotor disk 12
33 Magnetic return path lamination
34 Frame
35 Basic body of rotor disk 12
36 Basic body of stator disk 11
37 Polymer potting

I claim:

1. An electric disk-armature motor for an electric bicycle or pedelec, comprising:
    a stator in the form of a disk, and
    a first rotor in the form of an armature disk which is mounted rotatably about an axis of rotation with respect to the stator,
    wherein the first rotor and the stator are oriented parallel to one another and are spaced apart from one another by a gap,
    wherein an end side of the first rotor, which end side faces the stator, has a multiplicity of permanent magnets polarized in the axial direction, which permanent magnets are arranged in the form of a ring around the axis of rotation, wherein a north pole and a south pole faces the stator alternately in the tangential direction,
    wherein the stator has a multiplicity of coil elements, which are arranged in the form of a ring around the axis of rotation of the first rotor,
    wherein the stator is arranged between the first rotor and a second rotor, which are each mounted rotatably about the axis of rotation,
    wherein the coil elements of the stator are arranged in such a way that each respective coil axis is tangential to a circle having a center at the axis of rotation,
    wherein the coil elements each have a coil former with a coil core around which a coil wire is wound, wherein the coil core has, at its opposite ends along the coil axis, two mutually opposite pole bodies, which extend in the axial and/or radial direction in relation to the axis of rotation of the first rotor on both sides beyond the coil core, and
    wherein both pole bodies of each coil element each form pole faces, which each face the first or second rotor and are opposite the permanent magnets of the faced rotor, characterized
        in that the pole bodies are aligned radially in relation to the axis of rotation of the first rotor, with the result that a circumferential distance between the two pole bodies of a coil element increases as the two pole bodies extend farther from the axis of rotation of the first rotor, and in that the coil core is a flat body, whose radial extent in relation to the axis of rotation of the first rotor is larger than its axial extent.

2. The disk-armature motor as claimed in claim 1, characterized in that the pole faces are formed on a widened portion of the pole body, which widened portion is tangential in relation to the axis of rotation of the first rotor.

3. The disk-armature motor as claimed in claim 2, characterized in that the tangential widened portion of the pole body comprises a widened portion in the direction of the respective other pole body of the same coil element.

4. The disk-armature motor as claimed in claim 1, characterized in that the pole bodies are aligned radially in relation to the axis of rotation of the rotor, with the result that the tangential extent of the coil element increases as the radial distance from the axis of rotation of the first rotor increases.

5. The disk-armature motor as claimed in claim 1, characterized in that the coil core is a flat body, whose tangential length in relation to the axis of rotation of the first rotor is at least double its axial length.

6. The disk-armature motor as claimed in claim 1, characterized in that the coil formers consist partially or entirely of a magnetic polymer and/or of metal.

7. The disk-armature motor as claimed in one of claim 1, characterized in that the first and second rotors and/or the stator are manufactured in an injection molding process with inserts.

8. An electric disk-armature motor as claimed in claim 1, characterized in that the disk-armature motor is arranged between a bottom bracket and a chain ring on the pedal spindle of the electric bicycle or pedelec, wherein the first and second rotors are connected to the pedal spindle in such a way that the first and second rotors can transmit a torque to the pedal spindle.

9. The electric disk-armature motor as claimed in claim 8, characterized in that the transmission of the torque from the first and second rotors to the pedal spindle is performed via a direct fixed connection or toothed connection, without a transmission thread.

\* \* \* \* \*